United States Patent
Dewan et al.

(10) Patent No.: US 7,292,586 B2
(45) Date of Patent: Nov. 6, 2007

(54) MICRO-PROGRAMMABLE PROTOCOL PACKET PARSER AND ENCAPSULATOR

(75) Inventors: Gautam Dewan, San Jose, CA (US); Prabhas Kejriwal, Palo Alto, CA (US); Manish Muthal, Santa Clara, CA (US); Shashank Merchant, Santa Clara, CA (US); Chi Fai Ho, Sunnyvale, CA (US)

(73) Assignee: Nokia Inc., Irving, TX (US)

( * ) Notice: Subject to any disclaimer, the term of this patent is extended or adjusted under 35 U.S.C. 154(b) by 1316 days.

(21) Appl. No.: 09/823,802

(22) Filed: Mar. 30, 2001

(65) Prior Publication Data

US 2002/0198687 A1  Dec. 26, 2002

(51) Int. Cl.
*H04L 12/28* (2006.01)

(52) U.S. Cl. .................. 370/401; 370/392; 370/466

(58) Field of Classification Search ............ 370/389, 370/392; 717/168–173; 709/236, 238
See application file for complete search history.

(56) References Cited

U.S. PATENT DOCUMENTS

| | | | | |
|---|---|---|---|---|
| 5,560,039 | A * | 9/1996 | Dulong ........................ | 712/24 |
| 5,805,808 | A | 9/1998 | Hasani et al. ............. | 395/200.2 |
| 5,917,821 | A * | 6/1999 | Gobuyan et al. ........... | 370/392 |
| 5,958,044 | A * | 9/1999 | Brown et al. ............... | 712/219 |
| 6,157,641 | A | 12/2000 | Wilford ...................... | 370/389 |
| 6,157,955 | A | 12/2000 | Narad et al. ................ | 709/228 |
| 6,160,811 | A | 12/2000 | Partridge et al. ........... | 370/401 |
| 6,172,980 | B1 | 1/2001 | Flanders et al. ............ | 370/401 |
| 6,289,013 | B1 * | 9/2001 | Lakshman et al. .......... | 370/389 |
| 6,356,951 | B1 * | 3/2002 | Gentry, Jr. .................. | 709/250 |
| 6,363,380 | B1 * | 3/2002 | Dimitrova .................... | 707/6 |
| 6,367,068 | B1 * | 4/2002 | Vaidyanathan et al. ..... | 717/143 |
| 6,453,360 | B1 * | 9/2002 | Muller et al. ............... | 709/250 |
| 6,629,163 | B1 * | 9/2003 | Balassanian ................ | 710/33 |
| 6,789,116 | B1 * | 9/2004 | Sarkissian et al. .......... | 709/224 |
| 6,895,494 | B1 * | 5/2005 | Steiss et al. ................. | 712/24 |
| 6,920,562 | B1 * | 7/2005 | Kerr et al. .................. | 713/189 |
| 2005/0273772 | A1 * | 12/2005 | Matsakis et al. ............ | 717/136 |

FOREIGN PATENT DOCUMENTS

WO    WO 01/16698 A2    3/2001

OTHER PUBLICATIONS

PCT Notification of Transmittal of International Search Report or the Declaration for PCT Counterpart Application No. PCT/US02/09849 Containing International Search Report (Nov. 11, 2002).

(Continued)

*Primary Examiner*—Duc Ho
(74) *Attorney, Agent, or Firm*—Squire, Sanders & Dempsey L.L.P.

(57) ABSTRACT

A micro-programmable controller is disclosed for parsing a packet and encapsulating data to form a packet. The micro-programmable controller loads an instruction within the micro-controller. The instruction word has a plurality of instruction fields. The micro-controller processes the plurality of instruction fields in parallel. Each instruction field is related to a specific operation for parsing a packet or encapsulating data to form a packet. The programmable micro-controller can be programmed to handle packets to support new types of protocols by programming a template to string specific routines together based on an instruction set specific for parsing and encapsulating.

23 Claims, 9 Drawing Sheets

OTHER PUBLICATIONS

X. Jin et al., "Implementing Click IP Router Kernel on VLIW Architectures," XP-002208124, CS252 Class Project, University of California at Berkeley, pp. 1-5, May 2000.

Project Page, XP-002208125, CS252—Spring 2000, University of California at Berkeley, pp. 1-2, Mar. 2000.

"The Challenge for Next Generation Network Processors," XP-002208126, Agere, Inc., pp. 1-7, Sep. 10, 1999.

"PayloadPlus™ Functional Programming Language," XP-002208127, Preliminary Product Brief, Microelectronics Group, Lucent Technologies, Bell Labs Innovations, pp. 1-6, Apr. 2000.

"PayloadPlus™ Agere System Interface," XP-002208128, Preliminary Product Brief, Microelectronics Group, Lucent Technologies, Bell Labs Innovations, pp. 1-6, Apr. 2000.

N. Shah, "Understanding Network Processors," XP-002208129, Version 1.0, niraj@eecs.berkeley.edu, pp. 1-89, Sep. 4, 2001.

"PayloadPlus™ Routing Switch Processor," XP-002208130, Product Brief, Agere Systems, pp. 1-5, Jul. 30, 2001.

W.H. Mangione-Smith, G. Memik, "Network Processor Technologies," XP-002208131A, Network Processor Technologies Tutorial, Micro 34, billms@ucla.edu, memik@ee.ucla.edu, pp. 1-94, Dec. 1, 2001.

"Parallel eXpress Forwarding in the Cisco 10000 Edge Service Router," XP-002208132, White Paper, Cisco Systems, Inc., pp. 1-7, Dec. 31, 2000.

E. Kohler et al., "The Click Modular Router," XP-002208133, Laboratory for Computer Science, MIT, ACM Transactions on Computer Systems, vol. 18, No. 3, pp. 263-296, (Aug. 2000).

F. Kurfeβ*, "Potentially of Parallelism in Logic," TR-91-055, Preprint from: Wrightson, G and Fronhofer, B.; Parallelization in Inference Systems, Springer Verlag (1991).

G. Swallow, "MPLS Advantages for Traffic Engineering," Cisco Systems, IEEE Communication Magazine, Dec. 1999.

D. Wilson and R. V. Berry, "Amber Networks Unveils Industry's Most Advanced Optical Internet Edge Router," http://www.ambernetworks.com;press_release.html?id=2 (Jun. 6, 2000).

"The Technology of IP Routers in the New Public Network," White Paper, Ericsson IP Infrastructure, pp. 1-21, Jan. 2000.

"Unleash the Power, Building Multi-Service IP Networks With ATM Cores," The ATM Forum, pp. 1-12, Mar. 1999.

"Encapsulation,"http://whatis.techtarget.com/WhatIs_Search_Resu.../,282033,,00html?query=encapsulatio (Oct. 14, 1999).

"Point-to-Point Protocol," http://whatis.techtarget.com/WhatIs_Definition_Page/0,4152,214311,00.html (Nov. 3, 2000).

"User Datagram Protocol," http://whatis.techtarget.com/WhatIs_Search_Results_Exact/1,282033,,00.html?query=UDP (Oct. 10, 2000).

"Internet Protocol," http://whatis.techtarget.com/whatis.techtarget.com/WhatIs_Definition_Page/0,4152,214031,00.html (Oct. 5, 2000).

P. Wayner, "Will VLIW mean 'very long investment window' for Hewlett-Packard and Intel?," Core Technologies, VLIW Questions, http://www.byte.com/art/9411/sec12/art1.htm (Nov. 1994).

"VLIW at IBM Research," IBM Research, http://www.research.ibm.com/vliw/ (1995).

Baron, Robert J. et al., "Computer Architecture Case Studies," pp. xii-xiv, 25-34, 131-145 (Addison-Wesley Pub. Co., Inc. 1992).

Patterson, David A., et al., "Computer Architecture A Quantitative Approach," pp. xi-xv, 208-214, 322-325, 408-427, 571-594 (Morgan Kaufmann Publishers, Inc. 1990).

* cited by examiner

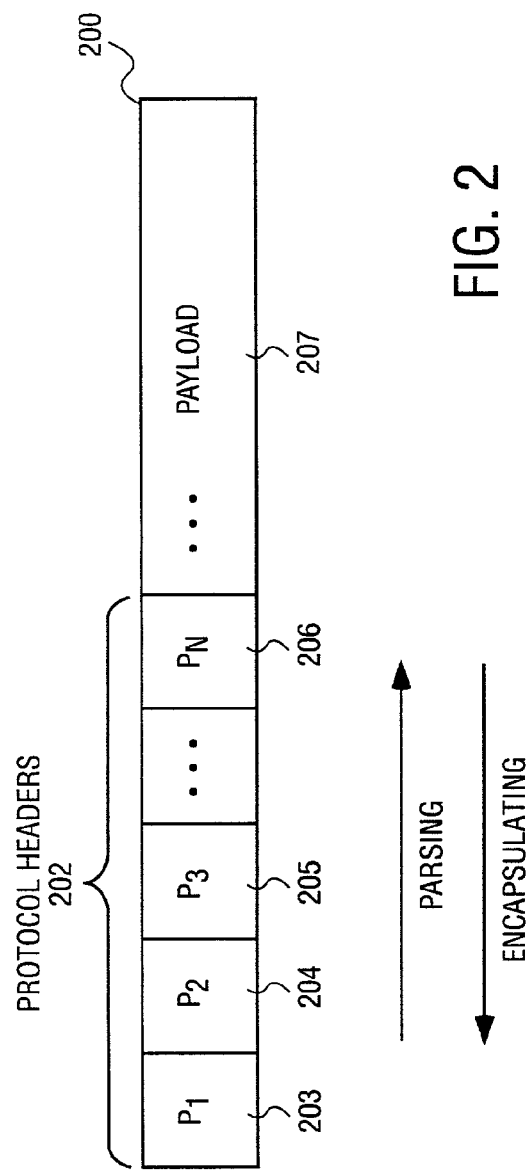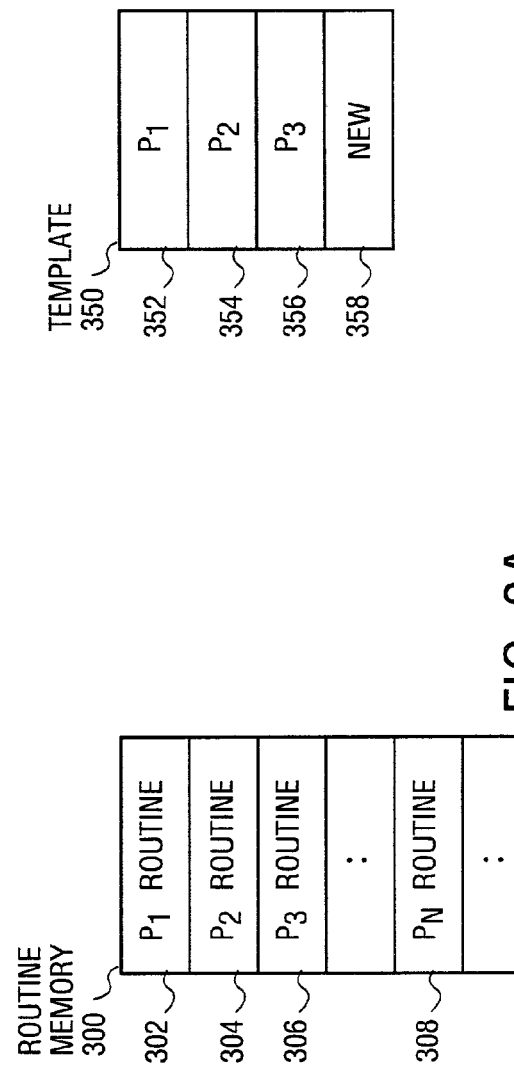

MICRO-PROGRAMMABLE PROTOCOL PACKET PARSER AND ENCAPSULATOR

FIELD OF THE INVENTION

The present invention pertains to the field of networking. More particularly, the present invention relates to a micro-programmable protocol packet parser and encapsulator.

BACKGROUND OF THE INVENTION

Today, a data unit ("packet") can traverse a number of interconnected networks to reach a destination. Typically, a network device such as a router routes and forwards packets across network boundaries using an optimal path. The router can use a number of protocols to route and forward the packets. A packet typically includes protocol headers to indicate the protocol being used for the packet and a payload section storing data. The router thus performs two basic types of operations such as parsing a packet of protocol headers to extract data within the packet and encapsulating data with protocol headers to form a packet for delivery.

A prior parsing and encapsulating technique is by hard-wired circuitry. That is, circuitry is hard-wired to parse specific packets or to encapsulate data with specific protocol headers for varying types of packets. A disadvantage, however, of using hard-wired circuitry is that it is not programmable. In particular, hard-wired circuitry is not flexible or adaptable to support packets for new types of protocols. For example, if a new protocol is being used for routing a packet, the packet will include a new type of protocol header. Consequently, if the hard-wired circuitry is not designed to handle the new type of protocol header, new hard-wired circuitry must be designed and implemented to support such a new protocol.

Another prior parsing and encapsulating technique is using a network processor that must access external memory to process code or instructions for performing parsing and encapsulating functions. A disadvantage of this technique is high latency due to the network processor spending time to accessing external memory. Such a high latency can cause parsing of a packet and encapsulating data to form a packet to be slow for a router. Consequently, because the parsing and encapsulating functions must be performed at very high speeds in order to keep up with the high data rates supported by a router, such a technique is not adequate to perform parsing and encapsulating at high data rates.

Another disadvantage of this technique is that a separate program is required for each type of variation a packet may have based on the number of combinations of protocols that may be supported for a packet. The number of programs can thus be very large thereby placing a heavy burden on memory resources. Consequently, the prior technique of a network processor accessing external memory to process code or instructions for parsing a packet or encapsulating data to form a packet is inefficient for a router.

SUMMARY OF THE INVENTION

A micro-programmable controller is disclosed for parsing a packet and encapsulating data to form a packet. In one embodiment, an instruction within the micro-controller is loaded. The instruction word has a plurality of instruction fields. The micro-controller processes the plurality of instruction fields in parallel. Each instruction field is related to a specific operation for parsing a packet or encapsulating data to form a packet. The programmable micro-controller can be programmed to handle packets to support new types of protocols by programming a template to string specific routines together based on an instruction set specific for parsing and encapsulating.

Other features and advantages of the present invention will be apparent from the accompanying drawings, and from the detailed description, which follows below.

BRIEF DESCRIPTION OF THE DRAWINGS

The present invention is illustrated by way of example and not limitation in the figures of the accompanying drawings, in which like references indicate similar elements and in which:

FIG. 2 illustrates a block diagram of a packet with protocol headers and a payload section according to one embodiment;

FIG. 3A illustrates a routine memory storing routines for parsing a packet and encapsulating data to form a packet according to one embodiment;

FIG. 3B illustrates a template stringing routines together to parse a packet or to encapsulate data to form a packet according to one embodiment;

DETAILED DESCRIPTION

A micro-programmable controller is described for parsing a packet and encapsulating data to form a packet. In one embodiment, an instruction within the micro-controller is loaded. The instruction word has a plurality of instruction fields. The micro-controller processes the plurality of instruction fields in parallel. Each instruction field is related to a specific operation for parsing a packet or encapsulating data to form a packet. The programmable micro-controller can be programmed to handle packets to support new types of protocols by programming a template to string specific routines together based on an instruction set specific for parsing and encapsulating.

The parsing and encapsulating techniques described herein provide low processing latency for parsing a packet or encapsulating data to form a packet. In particular, by loading instructions within a micro-controller, the micro-controller avoids accessing external memory to load instructions thereby reducing processing latency. Furthermore, the parsing and encapsulating techniques described herein reduce processing time for parsing a packet and encapsulating data to form a packet by processing a plurality of instruction fields within the instruction in parallel.

The parsing and encapsulating techniques described herein are implemented by a micro-controller that is programmable ("programmable micro-controller") so as to be adaptable and flexible to support existing and new types of protocols. The programmable micro-controller uses a template that is programmable in which specific routines are tied together to process specific protocols for a packet. By tying routines together for specific protocols (existing or new), a template can efficiently use memory space. Furthermore, to support a new type of protocol, a new routine can be easily downloaded and added to a template.

The programmable micro-controller uses a micro-instruction set specific for parsing and encapsulating. By using a micro-instruction set specific for parsing and encapsulating, the programmable micro-controller can perform very fast parsing and encapsulating functions. The programmable micro-controller can process the instruction set within routines, which are tied together in a template, thereby allowing efficient transfer of control for each routine.

Figure 1A:
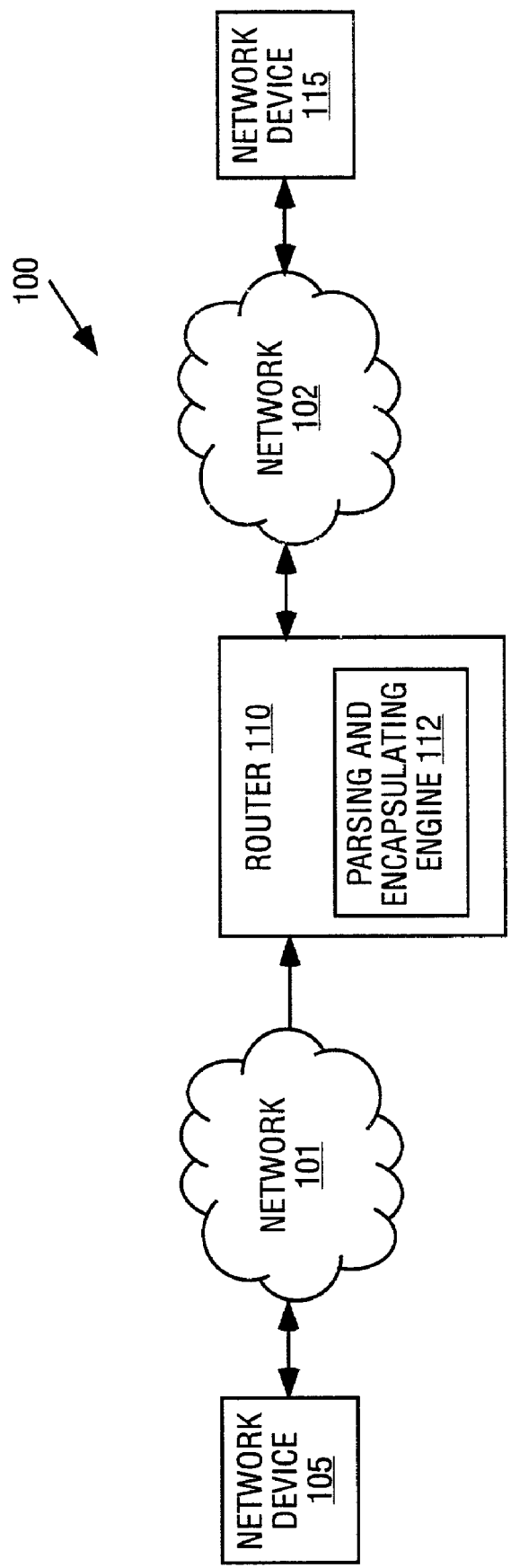
FIG. 1A illustrates an exemplary networking environment in which the present invention can be practiced.

FIG. 1 illustrates an exemplary networking environment 100 in which the present invention can be practiced. Referring to FIG. 1, networking environment 100 includes a network device 105 coupled to router 110 via network 101. Router 110 is also coupled to network device 115 via network 102. For purposes of illustration, two networks and devices are shown, however, network environment 100 can include any number of networks and devices including routers. Router 110 can receive and forward packets from and to network devices 105 and 115.

In one embodiment, network devices 105 and 115 can be a general purpose computer, server, or workstation. In other embodiments, networks devices 105 and 115 can be a router, gateway, hub, bridge, or switch. Network devices 105 and 115, however, are not intended to be limited to any particular type of network device. Networks 101 and 102 can represent any number of types of networks. For example, networks 101 and 102 can be a local area network LAN such as an Ethernet network or a wide area network WAN such as an Asynchronous Transfer Mode (ATM) network, frame relay network, or the Internet.

In one embodiment, router 110 is a network a device that performs Internet Protocol (IP) layer 3 service. That is, router 110 performs an IP layer 3 service to provide routing and forwarding functions so that a packet can reach its destination using an optimal path on the Internet. In other embodiments, router 110 can perform other network device services such as Multiprotocol Label Switching (MPLS) services. MPLS uses labels and an index to switch packets across networks. Router 110 can also operate to support standard 7-layer architecture model applications and services for network communications. That is, router 110 can operate as an IP router. Router 110 can also be a same type of device as network devices 105 and 115.

In one embodiment, router 110 can be a network router that is used to forward packets in one particular group of networks under the same administrative authority and control, which is commonly referred to as an Autonomous System (AS). As such, router 110 can represent an "Interior Router" that runs and supports Interior Gateway Protocols (IGPs) to exchange information within the AS.

If running and supporting IGPs, router 110 can operate routing protocols such as an Intermediate System-to-Intermediate System Protocol (IS-IS), Open Shortest Path First Protocol (OSPF), and a Routing Information Protocol (RIP). The IS-IS protocol and the OSPF protocol are link state protocols. A link state protocol uses link state packets to maintain a consistent view of the network. The RIP protocol is a simple protocol based on distance vectors that use a shortest path computation. Router 110 can parse packets and encapsulate to data form packets supporting the above IGP protocols.

In another embodiment, router 110 can represent a network router that is used to forward packets between Autonomous Systems (ASs) in which case the router is referred to as an "Exterior Router" and runs and supports Exterior Gateway Protocols (EGPs). If running and supporting EGPs, router 110 can operate a routing protocol such as a Border Gateway Protocol (BGP). The BGP protocol exchanges connectivity information over a reliable transport protocol such as the Transport Control Protocol (TCP) because the BGP protocol does not have error control capabilities. Router 110 can parse packets and encapsulate data to form packets supporting the above EGP protocols.

Router 110 includes a parsing and encapsulating engine 112 to parse a packet (e.g., packet 200) in extracting a payload or to encapsulate a payload with protocol headers (e.g., routing protocol headers) to form a packet. In one embodiment, parsing and encapsulating engine 112 is a programmable micro-controller, which includes an instruction set specific for parsing a packet or encapsulating data to form a packet. In other embodiments, the programmable micro-controller can be a programmable micro-processor or programmable system or subsystem on a chip.

As will be explained in further detail below, parsing and encapsulating engine 112 is micro-programmable to handle packets that support existing and new types of protocols. For example, a new routine can be downloaded to router 110, which programs parsing and encapsulating engine 112 to add a routine to a template to support the new protocol. As such, a new program does not have to be written for each of the different variations of the new protocol with existing protocols for a packet.

Figure 1B:
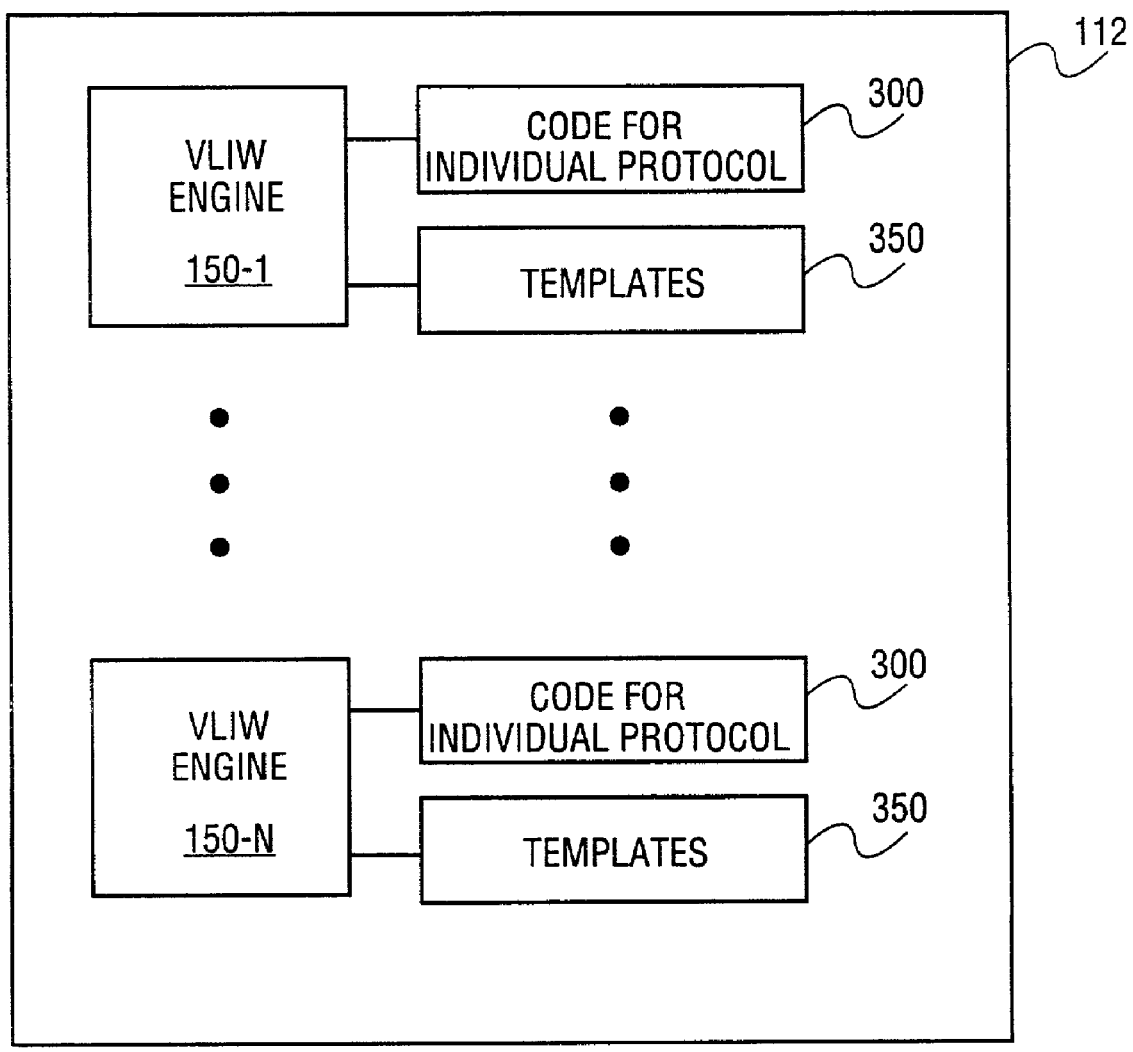
FIG. 1B illustrates a simplified block diagram of a parsing and encapsulating engine according to one embodiment.

FIG. 1B illustrates a simplified block diagram of parsing and encapsulating engine 112 according to one embodiment. In one embodiment, parsing and encapsulating engine 112 is a single system that can perform both parsing and encapsulating functions. In an alternative embodiment, parsing and encapsulating engine 112 can be two separate systems in which a parsing system performs parsing functions at a receiving end and an encapsulating system performs encapsulating functions at an output end. For purposes of explanation, parsing and encapsulating engine 112 is referred to as a single processing system. In one embodiment, parsing and encapsulating engine 112 is a system or subsystem on a chip, which is configured as a programmable micro-controller or microprocessor.

Referring to FIG. 1B, parsing and encapsulating engine 112 includes a plurality of Very Large Instruction Word (VLIW) engines 150-1 through 150-N. In the example of FIG. 1B, VLIW engines 150-1 through 150-N are coupled to the same embedded memory 300 storing code for individual protocols and to embedded memory 350 storing templates 350. VLIW engines 150-1 through 150-N, however, can be coupled to separate embedded memory devices. Embedded memory 300 and 350 refer to memory devices that are contained within parsing and encapsulating engine 112. For example, embedded memory 300 and 350 are memory devices embedded on the same system or subsystem on a chip or within the same micro-controller or micro-processor. Thus, parsing and encapsulating engine 112 does not require access to external memory for instructions.

VLIW engines 150-1 through 150-N can be Application Specific Integrated Circuits (ASICs) providing logic circuitry that is micro-programmable based on a VLIW architecture or horizontal micro-code instruction architecture. VLIW engines 150-1 through 150-N are used to perform parsing or encapsulating functions. For example, VLIW engine 150-1 can be configured to parse a packet and VLIW engine 150-N can be configured to encapsulate data to form a packet. Alternatively, VLIW engine 150-1 and 150-N can be configured to perform both parsing and encapsulating functions. Each of the VLIW engines 150-1 through 150-N can operate in parallel for parsing or encapsulating functions.

VLIW engines 150-1 through 150-N can process the code for individual protocols stored in embedded memory 300, which are based on VLIW instruction architectures or micro-code instruction architectures. In particular, the code for individual protocols include instructions having a plurality of instructions fields. VLIW engines 150-1 through 150-N are configured to process the plurality of instruction fields in parallel as will be explained in further detail below.

VLIW engines 150-1 through 150-N are configured to determine which instructions to process in embedded memory 300 based on the arrangement of routines within the templates stored in embedded memory 350. For example, the templates can string or tie together specific routines to handle specific protocols (existing or new) for a packet. To handle a new type of protocol, parsing and encapsulating engine 112 can download or program the templates within embedded memory 350 by adding a new routine based on a specific instruction set as exemplified in the Appendix.

FIG. 2 illustrates a block diagram of a packet 200 with protocol headers 202 and a payload section 207 according to one embodiment. Protocol headers 202 include a plurality of specific protocol headers $P_1$ (203) through $P_N$ (206) in which packet 200 supports. For example, packet 200 can include the following protocol headers with a payload section as shown in Table 1.

TABLE 1

(Exemplary Packet)

| PPP | IP | UDP | Payload |

In the example of Table 1, PPP refers to a Point-to-Point Protocol header for communicating between two systems at a layer 2 or physical level. For example, PPP defines how bits of information are transmitted on a physical link. UDP refers to a User Datagram Protocol header for communicating datagrams over the Internet Protocol (IP). Thus, IP refers to a header for communicating packets on the Internet. The IP header includes IP addresses for forwarding packets. Packet 200 can, however, include any number of existing protocol header combinations for existing protocols and may include protocol headers for new types of protocols. For example, a BGP routing protocol header can be used in packet 200.

Router 110 uses parsing and encapsulating engine 112 to parse packet 200 to determine which protocol headers are included in packet 200 in extracting payload 207 based on protocol headers 202. Likewise, router 110 uses parsing and encapsulating engine 112 to encapsulate payload 207 with protocol headers 202 to form packet 200 for delivery. For example, an IP protocol header may encapsulate a Transmission Control Protocol (TCP) protocol header for delivery of packet 200.

FIG. 3A illustrates a routine memory 300 storing routines for parsing a packet and encapsulating data to form a packet according to one embodiment. Routine memory 300 can represent the same embedded memory 300 shown in FIG. 1B. Referring to FIG. 3A, routine memory 300 stores a plurality of protocol routines as $P_1$ routine (302) through $P_N$ routine (308). Each routine includes a plurality of micro-instructions based on a specific instruction set for parsing or encapsulating such as that shown in FIG. 4 and in the Appendix.

For example, referring back to Table 1, P1 routine (302) may be a routine used to parse a packet having a PPP header or used to encapsulate data with a PPP header, P2 routine (304) may be a routine used to parse a packet having an IP header or used to encapsulate data with an IP header, and P3 routine (306) may be a routine used to parse a packet having a UDP header or used to encapsulate data with a UDP header.

Any number of routines for existing or new protocol headers may be stored in routine memory 300. The routines can be tied together in a template 350 such as that shown in FIG. 3B. Template 350 can represent embedded memory 350 shown in FIG. 1B. As shown in FIG. 3B, template 300 includes calls 352 through 356 that ties or strings together routines $P_1$ through $P_3$. Thus, regardless of the different types of protocol headers included in a packet, by using template 300 routines can be tied together to process the packet.

Furthermore, if a new protocol is being used for a packet, a new routine can be stored in routine memory 300. For example, $P_N$ routine (308) can be downloaded to router 110 via networks 101 or 115 or from an external device and stored in routine memory 300. Hence, as shown in FIG. 3B, a "New" call 358 can be added or programmed in template 350 to call $P_N$ routine 308 to handle a new protocol for parsing or encapsulating thereby allowing for a flexible and adaptable packet parser and encapsulator. In addition, by using template 300, memory space can be efficiently utilized because the routines are stored once and the routines can be called or tied together in any number of combinations within template 300 for varying types of packets with different or new protocol headers.

In another embodiment, a protocol header chain can have an ID and the ID can be stored in the template. For example, a template can be represented by 48 bits in which 6 bits represents a specific ID. As such, in the above example, a template can include 8 specific IDs. The IDs can call specific routines in routine memory 300. Parsing and encapsulating engine 112 can thus use template 350 to parse a packet to extract data or to encapsulate data to form a packet.

Figure 3C:
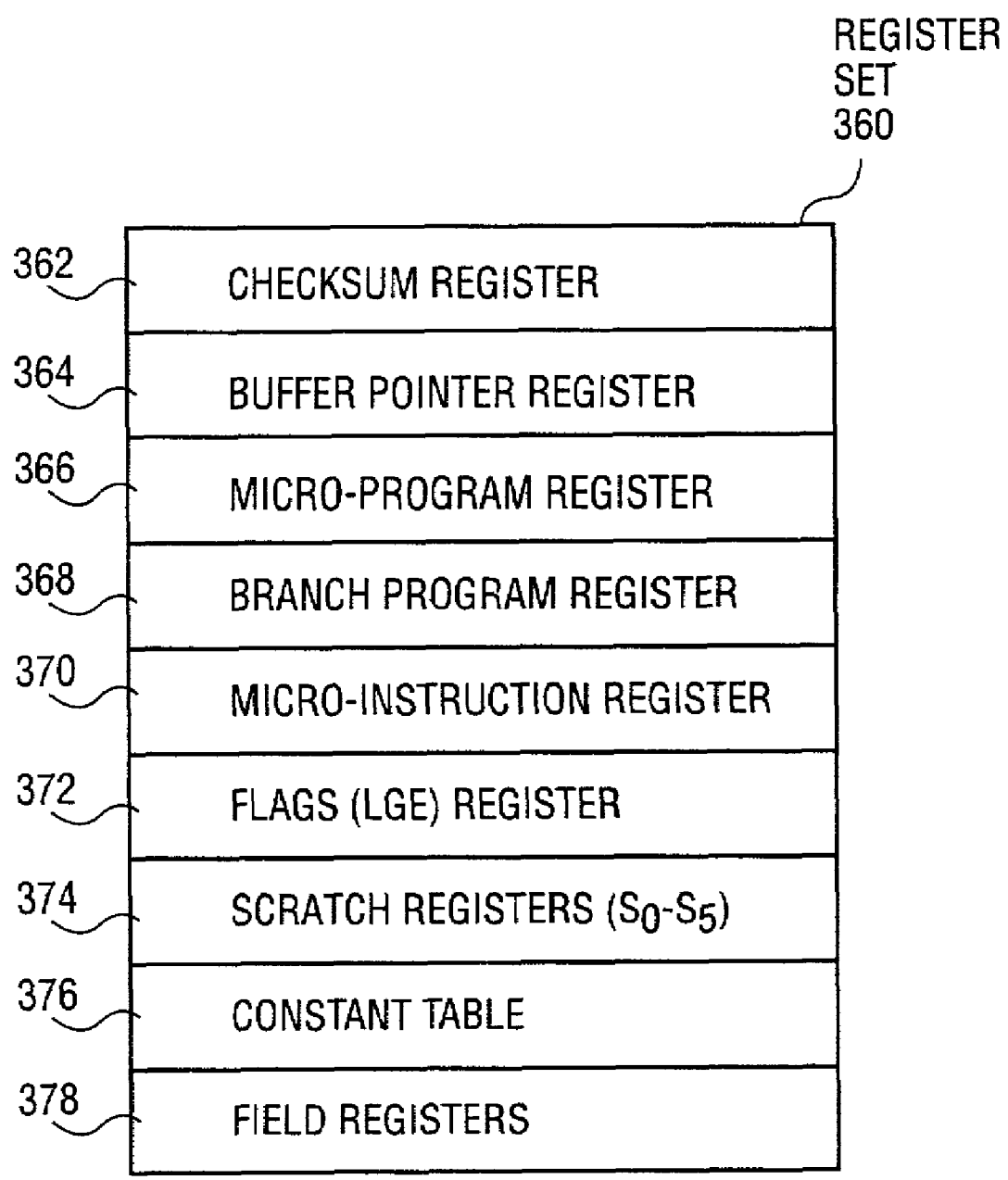
FIG. 3C illustrates a register set used in parsing a packet or encapsulating data to form a packet according to one embodiment.

FIG. 3C illustrates a register set 360 used by parsing and encapsulating engine 112. Referring to FIG. 3C, register set 360 includes a checksum register 362, buffer pointer register 364, micro program register 366, branch program register 368, micro instruction register 370, flags register 372, scratch registers ($S_0$-$S_5$) 374, constant table 376, and field registers 378. Register set 360 can represent a single register file or, alternatively, a plurality of individual registers.

Checksum register 362 stores checksum values for determining a correct number of bits in data. Checksum register 362 may include a plurality of bits (e.g., 16 bits) to store checksum computation values. Buffer pointer register 364 stores a pointer or address to a particular location in a packet buffer memory within parsing and encapsulating engine 112 that stores packets being parsed or stores data that is being encapsulated to form packets. For example, if parsing packet 200, buffer pointer register 364 stores the location in the packet buffer memory in which the next byte is to be parsed.

If encapsulating data, buffer pointer register 364 stores the location to add data in the packet buffer memory in forming a packet.

Micro-program register 366 stores a pointer or location to routine memory 300 in determining which instruction in a routine is to be executed. For example, micro-program register 366 can point to the location for processing an instruction within $P_1$ routine (302) stored in routine memory 300. Micro-instruction register 370 stores the actual instruction or contents of the location stored in micro-program register 366. Micro-instruction register 370 can store the current micro-instruction or subsequent micro-instructions to be executed by parsing and encapsulating engine 112. Branch program register 368 stores a pointer or location to a possible branch micro-instruction to be executed by parsing and encapsulating engine 112.

Flags (LGE) register 372 stores comparison values indicating, e.g., less than, greater than, or equal based on a compare function. Scratch registers $S_0$-$S_5$ store intermediate calculation values or data (e.g., for performing compare functions) used by parsing and encapsulating engine 112. Although nine registers are shown in FIG. 3C, any number of scratch registers can be used. Constant table 376 can store constant or fixed values or data related to protocols, which can be used to determine if certain data matches the constant values or data. For example, a certain protocol header may have 4 bytes of data that are fixed, constant table 376 can store such fixed bytes in determining if a parsed header matches the fixed bytes for that particular protocol header. Field registers 378 store fields while parsing a packet or fields to be used in encapsulating data to form a packet.

Figure 4:
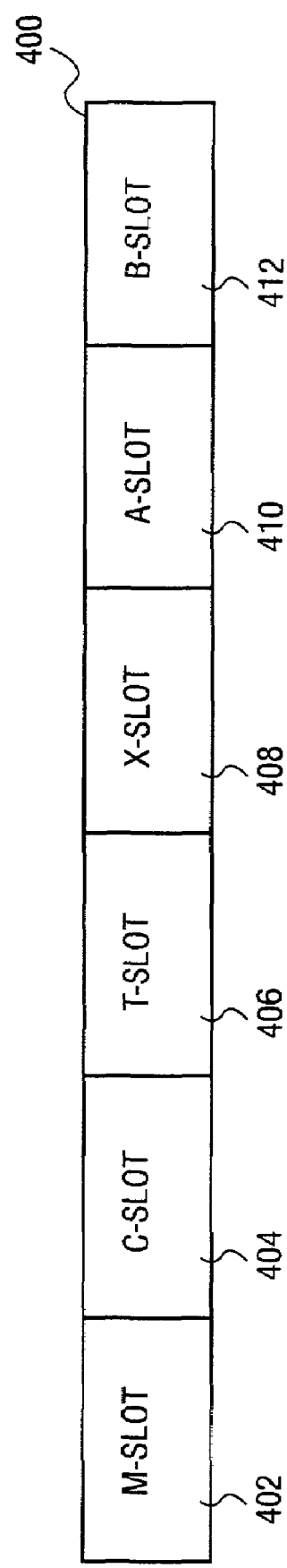
FIG. 4 illustrates a block diagram of an instruction with a plurality of operation slots according to one embodiment.

FIG. 4 illustrates a block diagram of an instruction 400 with a plurality of instruction or operation fields or slots according to one embodiment. Referring to FIG. 4, instruction 400 includes six slots for micro-operations. The six slots include a M-slot 402, C-slot 404, T-slot 406, X-slot 408, A-slot 410, and a B-slot 412. Each of the six slots include micro-operation sets as illustrated in the Appendix. All of the micro-operations in instruction 400 are executed in parallel using information from register set 360 of FIG. 3C. As shown in Table 2, a description for each of the six micro-operations is provided below.

TABLE 2

| Slot | Description |
| --- | --- |
| M | Memory load and store operation |
| C | Checksum computation operation |
| T | Test and compare operation |
| X | Data extraction and insertion operation |
| A | Branch target address operation |
| B | Branch trigger operation |

The M-slot memory load and store operation is used to extract or obtain data from a packet or add data to form a packet. The C-slot checksum computation operation is used to determine if a data contains the correct number of bits. This computation operation can be computed quickly by processing all of the slots in parallel. The T-slot test and compare operation is used to compare an incoming checksum with a calculated checksum and to set flags based on the comparison. For example, the comparison can set a less than flag, a greater than flag, or an equal to flag in flags (LGE) register 372. The X-slot data extraction and insertion operation is used for the actual parsing and encapsulating processes. That is, this operation is unique in that specific amounts of data (e.g., a byte) within a group of data can be extracted. Likewise, a specific amount data (e.g., a byte) can be inserted into a group of data to form a packet.

The A-slot branch target address operation and the B-slot branch trigger operation serve a special purpose for branching in a routine of instructions by breaking a branch process into two parts. The first part relates to the A-slot operation in which a branch to a target micro-instruction within a routine is made. The target micro-instruction can be stored in branch program register 368. The second part relates to the B-slot operation, which dictates if a branch to the target micro-instruction is to be made or to execute the next micro-instruction.

In one embodiment, two micro-instructions are fetched at the same time in one cycle. For example, micro-instruction register 366 can store the next micro-instruction to be executed and branch program register 368 can store the possible target micro-instruction for a branch process. Thus, a fetch can be made at the same time for a next micro-instruction and a branch target micro-instruction to provide efficient routine branching.

In one embodiment, instruction 400 can be processed in a pipeline. For example, as shown in Table 3 below, instruction 400 can be processed in four stages: a prefetch stage, fetch stage, decode stage, and an execute stage.

TABLE 3

| PF (Prefetch) | F (Fetch) | D (Decode) | E (Execute) |
| --- | --- | --- | --- |

In the prefetch state, an address for a next sequential micro-instruction and the possible branch target micro-instruction are stored in micro-program register 366 and branch program register 368, respectively, as explained above regarding the A-slot operation and the B-slot operation. In the fetch stage, the fetch for the both micro-instructions to be stored in micro-instruction register 366 and branch program register 368 is completed and the contents of one of the registers is selected for the decode stage.

In the decode stage, the micro-instruction is decoded for either a parsing or encapsulating process in which case the value in buffer pointer register 364 is adjusted accordingly. For example, if a 2 bytes of data have been parsed, buffer pointer register 364 will store a location adjusted by two bytes. In the execute state, all of the micro-instructions within the routine are completed and appropriate results are stored in respective registers of register set 360.

Figure 5:
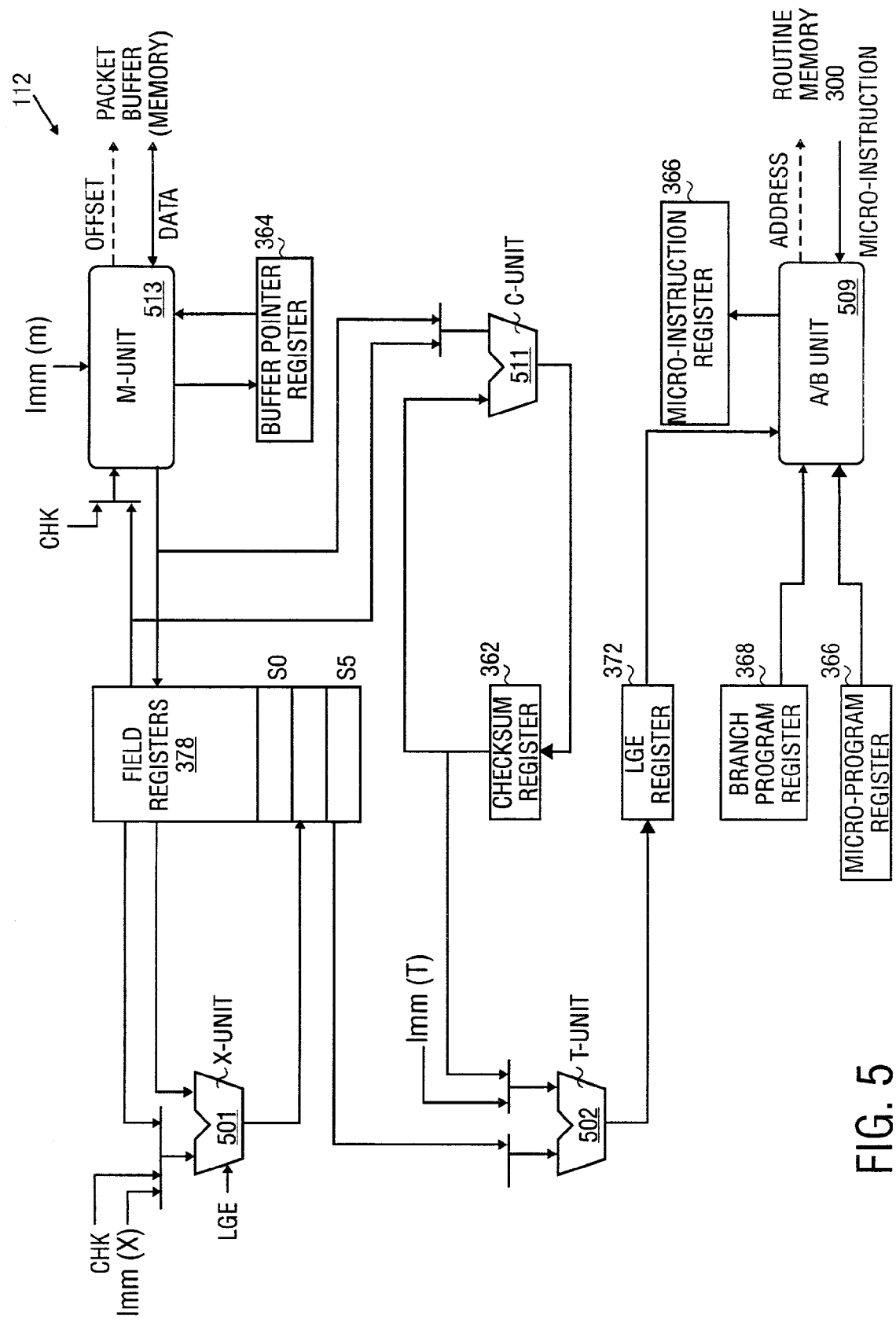
FIG. 5 illustrates a high level architecture of a VLIW engine of FIG. 1B to parse a packet or to encapsulate data to form a packet according to one embodiment.

FIG. 5 illustrates a high level architecture for a VLIW engine within parsing and encapsulating engine 112 of FIG. 1B according to one embodiment. The high level architecture of FIG. 5, however, can include other components such as register set 360 shown in FIG. 3C. Referring to FIG. 5, a VLIW engine includes an execution unit for each of the six slots 402 through 412 of instruction 400. In particular, M-unit 513 executes M-slot 402 instructions, C-unit 511 executes C-slot 404 instructions, T-unit 502 executes T-slot 406 instructions, X-unit 501 executes X-slot 408 instructions, and A/B unit 509 executes A-slot and B-slot instructions. By having an execution unit for each of the six slots of operations, the multiple slot of instructions can be processed in parallel during the execution cycle.

The example architecture shown in FIG. 5 can be used for both parsing and encapsulating operations, which uses registers in register set 360 of FIG. 3C. In one embodiment, a separate VLIW engine having the architecture of FIG. 5 can be used for parsing packets. In another embodiment, a separate VLIW engine having the architecture of FIG. 5 can be used for encapsulating data to form packets. For purpose of explanation, the architecture shown in represents a single engine. The operation of the architecture of FIG. 5 will now be explained in detail.

In the following description of the detailed operation of the example architecture of FIG. 5, the following labels have the following meanings. The labels "Imm(M)," "Imm(X)," and "Imm(T)," refer to programmed values that can be inputted to M-unit 513, X-unit 501, and T-unit 502, respectively. The label "CHK" refers to a checksum value.

M-unit 513 is a processing unit to perform memory or packet buffer memory load and store operations. M-unit 513 is to process M-slot 402 operations to perform parsing and encapsulating functions. For example, M-unit 513 can be used to execute the exemplary micro-instructions as detailed herein to perform parsing and encapsulating functions. To perform a parsing function, M-unit 513 can receive data from the packet buffer memory (not shown) based on information in buffer pointer register 364 and store the received data in field registers 378 based on CHK or Imm(M) inputs. To perform an encapsulating function, M-unit 513 can receive data from field registers 378 and store the data in the packet buffer memory based on information in buffer pointer register 364 based on CHK or Imm(M) inputs.

C-unit 511 is a processing unit to perform a checksum computation operation. C-unit 511 is to process C-slot 404 operations as described herein to perform the checksum computation. In one embodiment, C-unit 511 is an arithmetic logic unit (ALU) to calculate a checksum value. To perform the checksum computation, C-unit 511 can receive as inputs data retrieved by M-unit 513 and data from field registers 378 or scratch registers 374 and checksum value in checksum register 362. C-unit 511 stores the output of the checksum computation in checksum register 362. Furthermore, C-unit 511 is capable of snooping on a load path or store path to and from M-unit 513. For example, as bytes are being loaded or stored from and to M-unit 513, the bytes can be fed into C-unit 511, which can improve processing efficiency.

T-unit 502 is a processing unit to perform a test and compare operation. T-unit 502 is used to process the T-slot 406 operations as described herein. In one embodiment, T-unit 502 is an ALU to perform the test and compare operation. To perform a test and compare operation, T-unit 502 can receive as inputs Imm(T), output from scratch registers 374, and the checksum value stored in checksum register 362. T-unit 502 can compare checksum values against expected values indicated by Imm(T) or values in scratch registers 374. The result of the comparison is used to store flags in LGE register 372 indicating whether the result of T-unit 502 is less than, greater than, or equal to an expected value. The flag bits in LGE register 372 can be used in branching operations.

X-unit 501 is a processing unit to perform data extraction and insertion operations. X-unit is used to process X-slot 408 operations as described herein. In one embodiment, X-unit 501 is an ALU to perform the extraction and insertion operation. To perform data extraction, X-unit 501 can receive as inputs data from field registers 378, checksum value (CHK), and Imm(X) value. The result of the operation performed by X-unit 501 can be stored temporarily in scratch registers 374 or field registers 360. The data stored in scratch registers 374 or field registers 360 can be used to extract data or to add data to the packet buffer memory.

A/B unit 509 is a processing unit to perform branch target address and trigger operations. A/B unit 509 is used to process A-slot 410 and B-slot 412 operations as described herein. In one embodiment, A/B unit 509 can receive the data or information in the branch program register 368 and micro-program register 366. A/B unit 509 can store the branch micro-instruction based on branch program register 368 in micro-instruction register 370 based on the comparison flags in LGE register 372. For example, if the condition for a comparison is true to cause a branch, A/B unit 509 will store the branch target micro-instruction in micro-instruction register 366, which will be next micro-instruction executed by parsing and encapsulating engine 112.

In other embodiments, a interrupt mechanism can be implemented for the architecture of FIG. 5 to handle parsing across multiple buffers. In one embodiment, the instruction set described herein can ignore the size of a packet buffer. The effective offset into the packet buffer for loads and stores is computed by adding an offset to buffer pointer register 366 Bp (memory base register). If the offset to the packet buffer for any load or store exceeds the size of the packet buffer, an exception or interruption can be triggered to cause parsing and encapsulating engine 112 to save all active states in a connection state (CS) data structure, which can be included in register set 360. In such a case, the size of the packet buffer is subtracted from the value in buffer pointer register 364 before restoring pre-interrupt state. As such, buffer pointer register will now contain a negative offset. If a new packet is subtracted from buffer pointer register 364 before storing state, the buffer pointer register 364 will now contain a negative offset. If a new packet buffer is received, the restored state from the CS data structure reissues the load or store to cause the exception or interrupting. The effective offset into the packet buffer is now based on the value of buffer pointer register 364. Table 4 shown below illustrates actions on the processing of the micro-operation fields.

TABLE 4

| Micro-Operation Field | Action on Interrupt |
| --- | --- |
| M-Slot | Allow partial completion, restart and combine data |
| C-Slot | Allow completion at time of interrupt |
| T-Slot | Abort execution on interrupt, re-execute on restart |
| X-Slot | Allow completion at time of interrupt |
| A-Slot | Abort execution on interrupt, re-execute on restart |
| B-Slot | Store T bit and use T-bit during D state of restart |

Figure 6:
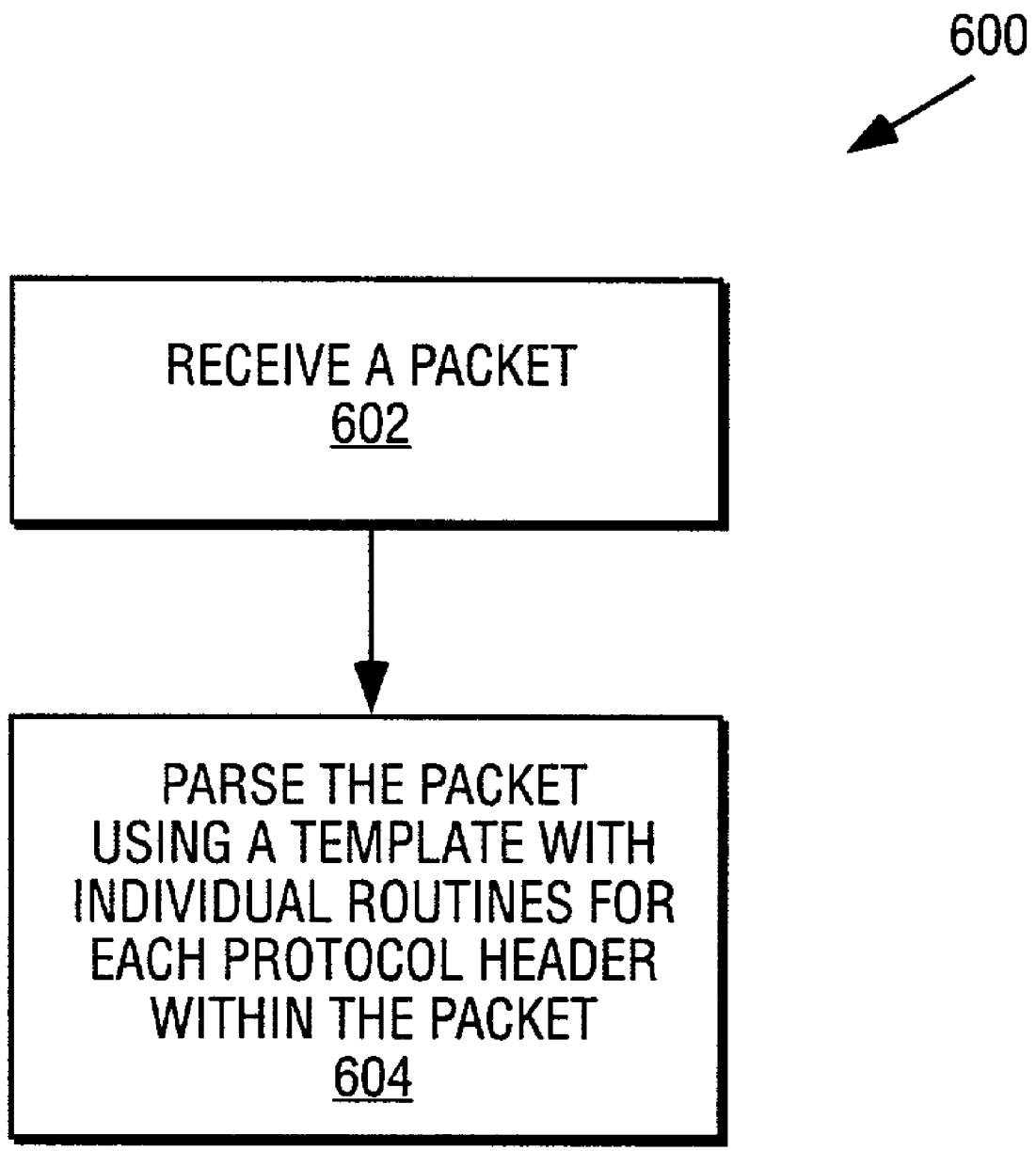
FIG. 6 illustrates a flow diagram of an operation to parse a packet according to one embodiment.

FIG. 6 illustrates a flow diagram of an operation 600 to parse a packet according to one embodiment. Initially, operation 600 begins at operation 602.

At operation 602, a packet is received. For example, a packet can be received in router 110 within a packet buffer memory.

At operation 604, the packet is parsed using a template with individual routines for each protocol header within the packet. For example, the architecture of FIG. 5 can receive instructions form routines that are called, e.g., from template 350, to parse the received packet.

Figure 7:
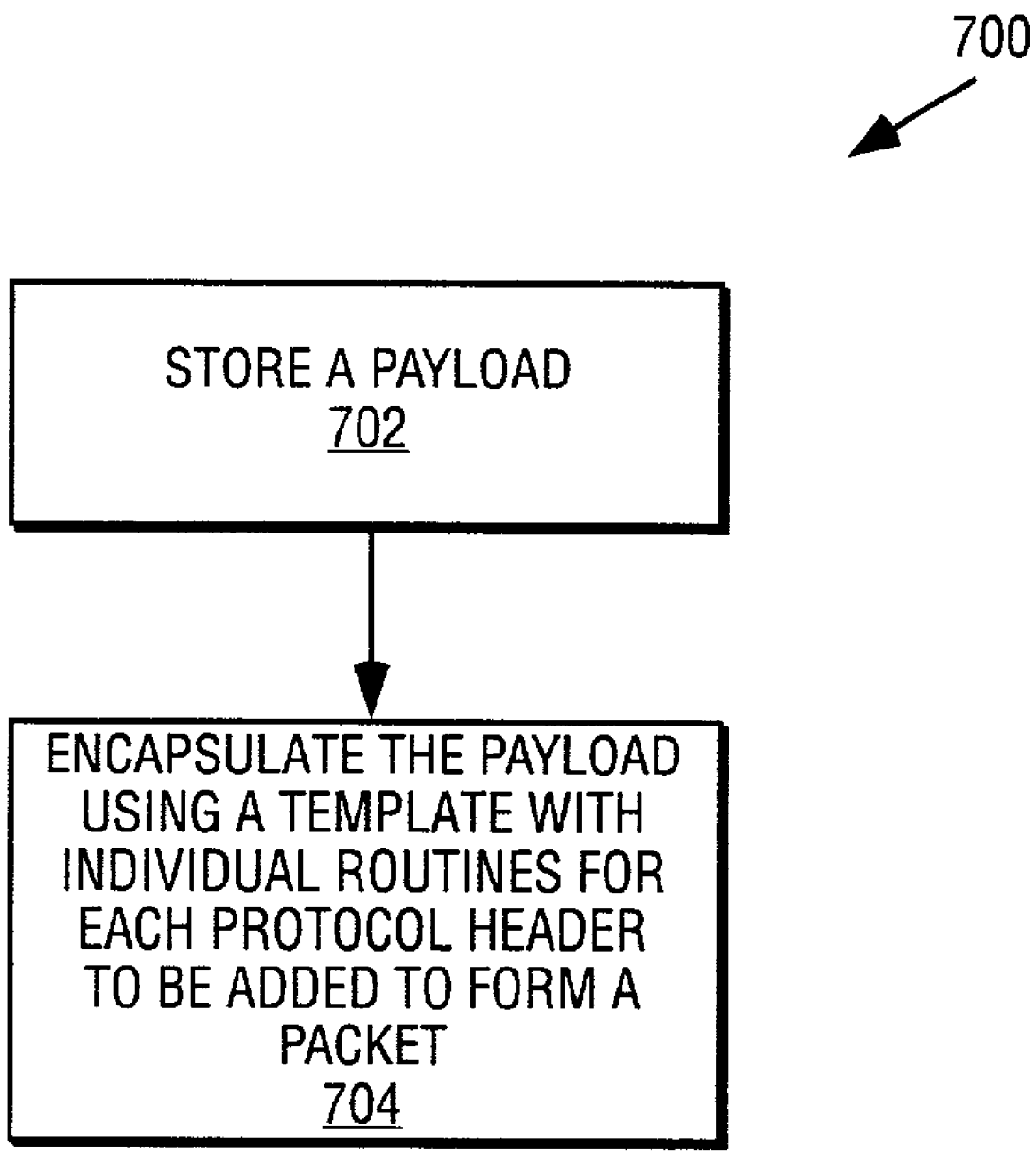
FIG. 7 illustrates a flow diagram of an operation to encapsulate data to form a packet according to one embodiment.

FIG. 7 illustrates a flow diagram of an operation 700 to encapsulate a packet according to one embodiment. Initially, operation 700 begins at operation 702.

At operation 702, a payload of data is stored. For example, the payload data can be stored in packet buffer memory for delivering packets on a network.

At operation 704, the payload of data is encapsulated using a template with individual routines for each protocol header to be added to form a packet. For example, the architecture of FIG. 5 can receive instructions form routines that are called, e.g., from template 350, to encapsulate the payload data to form a packet for delivery.

Figure 8:
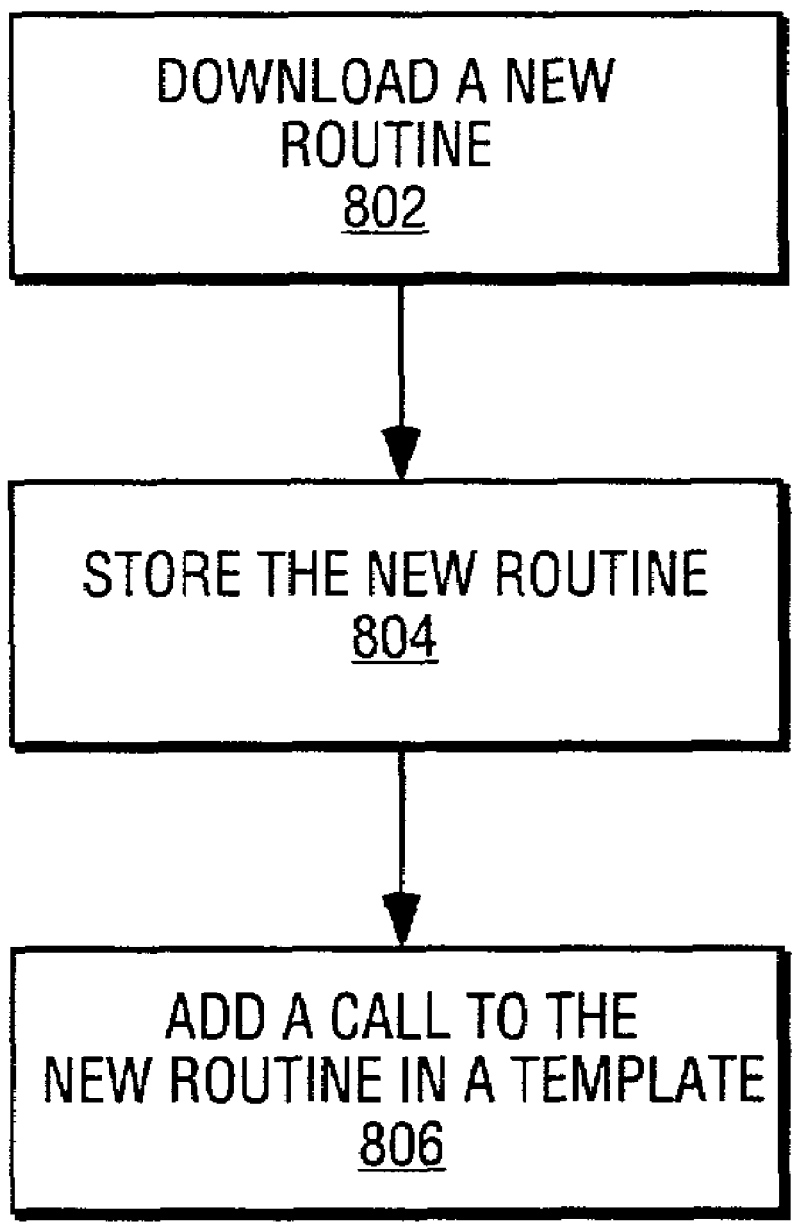
FIG. 8 illustrates a flow diagram of an operation to program the parsing and encapsulating engine of FIG. 1A.

FIG. 8 illustrates a flow diagram of an operation 800 to program the parsing and encapsulating engine 112 of FIG. 1. Initially, operation 800 begins at operation 802.

At operation 802, a new routine is downloaded. For example, a new routine can be downloaded to router 110 by a server on a network. Alternatively, an external device connect to router 110 can download the new routine.

At operation 804, the new routine is stored. For example, router 110 can store the new routine in routine memory 300.

At operation 806, a call to the new routine is added in a template. For example, template 350 can add a new call to the new routine. Thus, template 350 with the new call can be used to parse a packet using a new protocol header and to encapsulate data with the new protocol header.

The above protocol packet parser and encapsulator operations can be implemented using the example architecture of FIG. 5. For example, the example architecture can be used to executed the exemplary micro-operations described in the Appendix. In such an architecture, the operations can be stored on a storage device such as an embedded random access memory (RAM).

For alternate embodiments, the protocol packet parser and encapsulator operations can be implemented in discrete hardware or firmware. For example, one or more application specific integrated circuits (ASICS) could be programmed to perform the above described parsing and encapsulating operations. In another example, the parsing and encapsulating operations can be implemented in one or more ASICs on additional circuit boards and the circuit boards could be inserted into a router as described above. In another example, field programmable gate arrays (FPGAs) or static programmable gate arrays (SPGA) can be used to implement the parsing and encapsulating operations described herein. In yet another example, a combination or hardware and software could be used to implement redundancy operations described herein.

Thus, a micro-programmable protocol packet parser and encapsulator have been described. In the foregoing specification, the invention has been described with reference to specific exemplary embodiments thereof. It will, however, be evident that various modifications and changes may be made thereto without departing from broader spirit and scope of the invention as set forth in the appended claims. The specification and drawings are, accordingly, to be regarded in an illustrative sense rather a restrictive sense.

APPENDIX

(Exemplary Micro-Operation Slot Descriptions)

| M-Slot μOperation Set | | | |
|---|---|---|---|
| Category | Mnemonic | Src | Dest |
| Nop | | | |
| | Nop | | |
| | Halt | | |
| Buffer Pointer Mgmt | | | |
| | Add_Bp Rm | Rm, Bp | Bp |
| | Add_Bp_I Imm | Imm | Bp |
| | Sub_Bp, Rm | Rm, Bp | Bp |
| | Sub_Bp_I, Rm | Imm | Bp |
| | Rload_Bp, Rm | Rm | Bp |
| | Rload_Bp_I Imm | Imm | Bp |
| | Rstore_Bp, Rn | Bp | Rn |
| Load (PostIncrement) | | | |
| | Load8 @(bp)+, Rn | Bp, Mem | Rn |
| | Load16 @(bp)+, Rn | Bp, Mem | Rn |
| | Load32 @(bp)+, Rn | Bp, Mem | Rn |
| Load (Immediate) | | | |
| | Load8_I @(<offset>, bp), Rn | Imm, Mem, Bp | Rn |
| | Load16_I @(<offset>, bp), Rn | Imm, Mem, Bp | Rn |
| | Load32_I @(<offset>, bp), Rn | Imm, Mem, Bp | Rn |
| Load (Register) | | | |
| | Load8_R @(Rm, bp), Rn | Rm, Mem, Bp | Rn |
| | Load16_R @(Rm, bp), Rn | Rm, Mem, Bp | Rn |
| | Load32_R @(Rm, bp), Rn | Rm, Mem, Bp | Rn |
| Store (PreDecrement) | | | |
| | Store8 Rm, @-(bp) | Rm, Bp | Mem |
| | Store16 Rm, @-(bp) | Rm, Bp | Mem |
| | Store32 Rm, @-(bp) | Rm, Bp | Mem |
| Store (Immediate) | | | |
| | Store8_I Rm, @(<offset>, bp) | Imm, Rm, Bp | Mem |
| | Store16_I Rm, @(<offset>, bp) | Imm, Rm, Bp | Mem |
| | Store32_I Rm, @(<offset>, bp) | Imm, Rm, Bp | Mem |
| | Store16_Chk_I@(<offset>, bp) | Imm, Chk, Bp | Mem |
| Store(Register) | | | |
| | Store8 Rm, @(Rn, bp) | Rm, Rn, Bp | Mem |
| | Store16 Rm, @(Rn, bp) | Rm, Rn, Bp | Mem |
| | Store32 Rm, @(Rn, bp) | Rm, Rn, Bp | Mem |

| X-Slot μOperation Set ||||
|---|---|---|---|
| Category | Mnemonic | Src | Dest |
| Nop | | | |
| | Nop | | |
| Move | | | |
| | Mov Rm, Rn | Rm | Rn |
| | Mov_I<value>, Rn | Imm | Rn |
| | Mov_C<index>, Rn | Const | Rn |
| Conditional Move | | | |
| | Cmov.e Rm, Rn | Rm, LGE | Rn |
| | Cmov.ne Rm, Rn | Rm, LGE | Rn |
| | Cmov_I.e<value>, Rn | Imm, LGE | Rn |
| | Cmov_I.ne<value>, Rn | Imm, LGE | Rn |
| | Cmov_C.e<index>, Rn | Const, LGE | Rn |
| | Cmov_C.ne<index>, Rn | Const, LGE | Rn |
| Extract | | | |
| | Extract4.k Rm, Rn (k=0, 1, 2, ..., 7) | Rm | Rn |
| | Extract8.k Rm, Rn (k=0, 1, 2, 3) | Rm | Rn |
| | Extract16.k Rm, Rn (k=0, 1) | Rm | Rn |
| Insert | | | |
| | Insert4.k Rm, Rn (k=0, 1, 2, ..., 7) | Rm, Rn | Rn |
| | Insert8.k Rm, Rn (k=0, 1, 2, 3) | Rm, Rn | Rn |
| | Insert16.k Rm, Rn (k=0, 1) | Rm, Rn | Rn |
| Chk Register Access | | | |
| | Rstore_Chk Rn | Chk | Rn |
| Arithmetic | | | |
| | Add Rm, Rn | Rm, Rn | Rn |
| | Add_I<value>, Rn | Imm, Rn | Rn |
| | Sub Rm, Rn | Rm, Rn | Rn |
| | Sub_I<value>, Rn | Imm, Rn | Rn |
| Logical | | | |
| | Or Rm, Rn | Rm, Rn | Rn |
| | Or_I<value>, Rn | Imm, Rn | Rn |
| | And Rm, Rn | Rm, Rn | Rn |
| | And_I<value>, Rn | Imm, Rn | Rn |
| | Xor Rm, Rn | Rm | Rn |
| | Xor_I<value>, Rn | Imm, Rn | Rn |
| | Set<position>, Rn | Imm, Rn | Rn |
| | Clr<position>, Rn | Imm, Rn | Rn |
| Shift | | | |
| | Lshift1 Rn | Rn | Rn |
| | Lshift2 Rn | Rn | Rn |
| | Lshift8 Rn | Rn | Rn |

|   | Rshift1 Rn | Rn | Rn |
|---|---|---|---|
|   | Rshift2 Rn | Rn | Rn |
|   | Rshift8 Rn | Rn | Rn |

| C-Slot μOperation Set ||||
|---|---|---|---|
| Category | Mnemonic | Src | Dest |
| Checksum Initiate ||||
|   | Lchk | L input | Chk |
|   | Schk | S input | Chk |
|   | Rchk | R input | Chk |
| Checksum Accumulate ||||
|   | Lchk_acc | L input, Chk | Chk |
|   | Schk_acc | S input, Chk | Chk |
|   | Rchk_acc | R input, Chk | Chk |

| T-Slot μOperation Set ||||
|---|---|---|---|
| Category | Mnemonic | Src | Dest |
| Nop ||||
|   | Nop |   |   |
| Compare ||||
|   | Cmp Rn, Rm | Rm, Rn | LGE |
|   | Cmp_I Imm, Rm | Rm, Imm | LGE |
|   | Cmp_Chk Rm | Chk, Rm | LGE |
| Test ||||
|   | Test_I Imm, Rm | Rm, Imm | LGE |

| A-Slot μOperation Set ||||
|---|---|---|---|
| Category | Mnemonic | Src | Dest |
| Nop ||||
|   | Nop |   |   |
| Load Target Address ||||
|   | Bra<label> | Imm | BrPC |
|   | Bra_Next_protocol | Template | BrPC |

| B-Slot μOperation Set ||||
|---|---|---|---|
| Category | Mnemonic | Src | Dest |
| Branch Trigger ||||
|   | Br.e | BrPC, LGE | μPC |
|   | Br.ne | BrPC, LGE | μPC |
|   | Br.l | BrPC, LGE | μPC |
|   | Br.le | BrPC, LGE | μPC |

|  | Br.g | BrPC, LGE | $\mu$PC |
|---|---|---|---|
|  | Br.ge | BrPC, LGE | $\mu$PC |
|  | Jmp | BrPC | $\mu$PC |

Exemplary Micro-Operation Descriptions

Add_Bp Rm
Add register to Bp instruction. M slot.
Bp ← Bp + Rm[1]

1. Lowest octet from Rm, Bp = 1 octet

Add_Bp_I <Imm>
Add immediate to Bp instruction. M slot.
Bp ← Bp + <Imm>[1]

1. (Imm = 1 octet, Bp = 1 octet)

Add Rm, Rn
Add instruction. X slot
Rn ← Rn + Immediate[1]

1. 4 octet operation.

Add_I <Imm>, Rn
Add Immediate instruction. X Slot.
Rn ← Rn + Immediate[1]

1. Immediate = 1 octet, Rn = 4 octets

And Rm, Rn
Logical and instruction. X slot
Rn ← Rn & Rm[1]

1. Imm = 1 octet, Rn = 4 octets

And_I <Imm>, Rn
Logical and immediate instruction. X slot.
Rn ← Rn & Immediate[1]

1. Immediate = 1 octet, Rn = 4 octets

Br.e
Branch on equal trigger instruction. B Slot.
If(E) $\mu$PC ← BrPC.

Br.g
Branch on greater-than trigger instruction. B slot.
If(G) $\mu$PC←BrPC

Br.ge
Branch on greater-than or equal-to trigger instruction. B slot.
If(G \\ E) $\mu$PC←BrPC

Br.l
Branch on less-than trigger instruction. B slot.
If(L) $\mu$PC←BrPC

Br.le
Branch on less-than or equal-to trigger instruction. B slot.
If(L \\ E) $\mu$PC←BrPC

Br.ne
Branch on not-equal trigger instruction. B slot.
If(~E) $\mu$PC←BrPC←

Bra<Imm>
Branch address instruction. A slot.
BrPC←Immediate

Bra_Next_Protocol
Branch to next protocol. B slot.
BrPC←f(template[next_protocol])[1,2]

1. next_protocol=a pointer into the protocol chain template in the Connection State.
2. f = a mapping function from a protocol_id to the $\mu$Program Store entry point for the protocol. (Left shift by a configurable number of bits).

Clr.k Rn (k=0,1,...,31)
Clear bit instruction. X slot.
Rn←Rn & (~(0x1 <<k)).

Cmov.e Rm, Rn
Conditional move on equal instruction. X slot.
If(E) Rn←Immediate[1]

1. 4 octet operation.

Cmov.ne Rm, Rn
Conditional move on not-equal instruction. X slot.
If(~E) Rn←Immediate[1]

1. 4 octet operation.

Cmov_I.e <Imm>, Rn
Conditional move immediate on equal instruction. X slot.
If(E) Rn ← Immediate[1]

1. Lowest octet (byte 3) in Rn gets the data, other 3 octets are cleared.

Cmov_I.ne <Imm>, Rn
Conditional move immediate on not-equal instruction. X slot.
If(~E) Rn ← Immediate[1]

1. Lowest octet (byte 3) in Rn gets the data, other 3 octets are cleared.

Cmov_C.e<Index>, Rn
Conditional move constant on equal instruction. X slot.
If(E) Rn ← ConstantTable[index]

Cmov_C.ne<Index>, Rn
Conditional move constant on not-equal instruction. X slot.
If(~E) Rn ← ConstantTable[index])

Cmp Rm, Rn
Compare instruction. T slot.
If(Rn = = Rm) E ← true[1]
If(Rn > Rm) G ← true
If(Rn < Rm) L ← true 1. 32 bit comparison operation

Cmp_I <Imm>, Rm
Compare immediate instruction. T slot.
If(Rm = = Immediate) E ← true[1]
If(Rm > Immediate) G ← true
If(Rm < Immediate) L ← true 1. 8 bit comparison operation (Low order byte in Rm, byte 3, with immediate)

Cmp_Chk Rm
Compare checksum register. T slot.
If(Rm = = Chk) E ← true[1]
If(Rm > Chk) G ← true
If(Rm < Chk) L ← true 1. 16 bit comparison operation (Low order bytes in Rm, bytes 2 & 3, with immediate)

Extract4.k Rm, Rn (k=0,1,2,3,4,5,6,7)
Extract half-octet instruction. X slot.
Rn ← ((Rm >>(7-k)*4) & 0xF) [1]

1. half-octet is inserted at the least significant location (bits 3:0), other 3.5 octets are cleared in destination

Extract8.k Rm, Rn (k=0,1,2,3)
Extract octet instruction. X slot.
Rn ← ((Rm >> (3-k)*8) & 0xFF) [1]

1. one octet is inserted at the least significant location (byte 3), other 3 octets are cleared in destination 1.

Extract16.k Rm, Rn(k=0,1)
Extract double-octet instruction. X slot.
Rn ← Rm ((Rm >> (1-k)*16) & 0xFFFF)

1. 2 octets are inserted the at least significant location (bytes 2 & 3), other 2 octets are cleared in destination.

Halt
Halt Instruction. M Slot.
Terminate processing.

Insert4.k Rm, Rn (k=0,1,2,3,4,5,6,7)
Insert half-octet instruction. X slot.
Rn ← ((Rn & (~0xF << ((7-k)*4))) | ((Rm & 0xF) << ((7-k)*4))) [1]

1. half-octet is inserted at nibble position k, other 3.5 bytes remain unchanged.

Insert8.k Rm, Rn (k=0,1,2,3)
Insert octet instruction. X slot.
Rn ← ((Rn & (~0xF << ((3-k)*8)))|((Rm & 0xFF) << ((3-k)*8))) [1]

1. 1 octet is inserted at byte position k, other 3 bytes remain unchanged

Insert16.k Rm, Rn (k=0,1)
Insert double-octet instruction. X slot.
Rn ← ((Rn & (~0xF << ((3-k)*8)))|((Rm & 0xFF) << ((3-k)*8))) [1]

1. 2 octets are inserted at double-octet position k, other 2 bytes remain unchanged

Jmp
Jump Instruction. B slot.

μPC ← BrPC.

Lchk
Checksum of load data. C slot.
Chk ← low-order-octet + high-order-octet. [1]

1. One's Complement Addition. (Internet Checksum Algorithm)

Lchk_acc
Checksum with accumulate of load data. C slot.
Chk ← Chk + low-rder-octet + high-order-octet.

Load8@(Bp)+, Rn
Load octet with post-increment addressing instruction. M slot.
Rn ← Memory[Bp] [1]
Bp ← Bp + 1

1. 1 octet data - goes to least significant byte in destination register, other bytes are cleared, 8 bit offset.

Load8_I@(<Imm>, Bp), Rn
Load octet with immediate addressing instruction. M slot.
Rn ← Memory[Immediate + Bp] [1]

1. 1 octet data - goes to least significant byte in destination register, other bytes are cleared. 8 bit offset.

Load8_R@(Rm,Bp), Rn
Load octet with register addressing instruction. M slot.
Rn ← Memory[Register + Bp] [1]

1. 1 octet edata - goes to least significant byte in destination register, other bytes are cleared. 8 bit offset - use only the lowest octet from address register.

Load16@(Bp)+, Rn
load unaligned double-octet with post-increment addressing instruction. M slot.
Rn ← Memory[Rm+Bp] [1,2]
Bp ← Bp+2 ← ←

1. 16 bit data - goes to lower order two bytes in destination register, other bytes are cleared.
2. Byte aligned offset.

Load16@(<Imm>, Bp), Rn
Direct load unaligned double-octet instruction. M slot.
Rn ← Memory[Immediate + Bp] [1,2]

1. 16 bit data - goes to lower order two bytes in destination register, other bytes are cleared.
2. Byte aligned offset.

Load16@(<Imm>, Bp), Rn
Direct load unaligned double-octet instruction. M slot.
Rn ← Memory[Immediate + Bp][1,2]

1. 16 bit data - goes to lower order two bytes in destination register, other bytes are cleared.
2. Byte aligned offset.

Load32@(<Imm>, Bp), Rn
Direct load unaligned quad-octet instruction. M slot.
Rn ← Memory[Immediate + Bp] (32 bits)

Load32@(Bp)+, Rn
Register Indirect load unaligned quad-octet instruction. M slot.
Rn ← Memory[Rm + Bp] (32 bits)
Bp ← Bp + 4

Lshift1 Rn
Left shift by one instruction. X slot.
Rn ← Rn << 1

Lshift2 Rn
Left shift by two instruction. X slot.
Rn ← Rn << 2

Lshift8 Rn
Left shift by eight instruction. X slot.
Rn ← Rn << 8

Mov Rm, Rn
Move instruction. X slot.
Rn ← Rm

Mov_C<Index>, Rn
Move constant instruction. X slot.
Rn ← ConstantTable[index] (4 octets)

Mov_I<Imm>, Rn
Move immediate instruction. X slot.
Rn ← Immediate

Nop
No operation instruction. All slots.
No operation

Or Rm, Rn
Inclusive Or instruction. X slot.
Rn ← Rn or Rm (4 octets)

Or_I<Imm>, Rn
Inclusive or immediate instruction. X slot.
Rn ← Rn | Immediate (Immediate = 1 octet, Rn =0 4 octets).

Rchk
Checksum of x-slot data. C slot.
Chk ← low-order-octet + high-order-octet[1]

1. One's Complement Addition. (Internet Checksum Algorithm)

Rchk_acc
Checksum with accumulate of x-slot data. C slot.
Chk ← Chk + low-order-octet + high-order-octet[1]

1. One's Complement Addition. (Internet Checksum Algorithm)

Rload_Bp Rm
Load memory base register. X slot.
Bp ← Rm (Lowest octet)

Rload_Bp_I<Imm>
Load memory base register with immediate. X slot.
Bp ← Immediate (1 octet)

Rshift1 Rn
Left shift by one instruction. X slot.
Rn ← Rn >> 1

Rshift2 Rn
Left shift by two instruction. X slot.
Rn ← Rn >> 2

Rshift8 Rn
Left shift by eight instruction. X slot.
Rn ← Rn >> 8

Rstore_Bp, Rn

Store memory base register. M slot.
Rn ← Bp (Lowest octet of Rn gets Bp, remaining octets are cleared).

Rstore_Chk, Rn
Store memory base register. X slot.
Rn ← ~Chk[1,2]

1. Lowest two octets of Rn get Chk, remaining octets are cleared.
2. Rn gets one's complement of Chk

Schk
Checksum of score data. C slot.
Chk ← low-order-octet + high-order-octet.[1]

1. One's Complement Addition. (Internet Checksum Algorithm)

Set.k Rn (k=0,1,..., 31)
Set bit instruction. X slot.
Rn ← Rn | (0x1 << k).

Store8 Rm, @<Imm>
Store octet instruction. M slot.
Memory[Immediate + Bp} ← Rm (8 bits)

Store16 Rm, @<Imm>
Store unaligned double-octet instruction. M slot.
Memory[Immediate + Bp] ← Rm (16 bits)

Store32 Rm, @<Imm>
Store unaligned double-octet instruction. M slot.
Memory[Immediate + Bp] ← Rm (32 bits)

Sub_Bp Rm
Subtract register from Bp instruction. M slot.
Bp ← Bp - Rm. (Lowest octet from Rm, Bp = 1 octet)

Sub_Bp_I <Imm>
Subtract immediate from Bp instruction. M slot.
Bp ← Bp - <Imm> (Imm = 1 octet, Bp = 1 octet)

Sub Rm, Rn
Subtract Instruction. X slot.
Rn ← Rn-Rm. (4 octets)

Sub_I<Imm>, Rn

Subtract immediate instruction.
Rn ← Rn - Immediate (Imm = 1 octet, Rn = 4 octets).

Test_I <Imm>, Rm
Test a register against a mask instruction. T slot.
If((Rm & Immediate) = = 0) E ← 0 Else E ← 1

Xor Rm, Rn
Exclusive Or Instruction. X slot.
Rn ← Rn ^ Rm. (4 octets)

Xor_I Rm, Rn
Exclusive Or immediate instruction. X slot.
Rn ← Rn ^ Immediate. (Immediate = 1octet, Rn = 4 octets)

What is claimed is:

1. A method for a programmable micro-controller comprising:
   loading an instruction word within the micro-controller, the instruction word having a plurality of instruction fields; and
   processing the plurality of instruction fields in parallel, each instruction field related to a specific operation for parsing a packet or encapsulating data to form a packets wherein the packet includes a protocol header, and,
   wherein the instruction word is loaded from a template, the template having a routine associated with a protocol header in the packet.

2. The method of claim 1, wherein the packet includes one or more protocol headers.

3. The method of claim 2, further comprising:
   programming the micro-controller by adding a new routine to the template.

4. The method of claim 3, wherein the new routine is related to a new protocol.

5. The method of claim 1, wherein the processing of the plurality of instruction fields in parallel includes:
   performing a memory load and store operation;
   performing a checksum computation operation;
   performing a test and compare operation;
   performing a data extraction and insertion operation;
   performing a branch target address operation; and
   performing a branch trigger operation.

6. A programmable micro-controller comprising:
   an embedded memory configured to store one or more instruction words, each instruction word including a plurality of instruction fields; and
   one or more processing engines, each processing engine configured to process the plurality of instruction fields in parallel for each instruction word, each instruction field related to a specific operation for parsing a packet or encapsulating data to form a packets wherein the packet includes a protocol header, and,
   wherein the embedded memory is further configured to store a template, the template having a routine associated with a protocol header in the packet.

7. The programmable micro-controller of claim 6, wherein the packet includes one or more protocol headers.

8. The programmable micro-controller of claim 7, wherein the subsystem is programmed by adding a new routine to the template.

9. The programmable micro-controller of claim 8, wherein the new routine is related to a new protocol.

10. The programmable micro-controller of claim 6, wherein each processing engine includes:
    an execution unit configured to perform a memory load and store operation;
    an execution unit configured to perform a checksum computation operation;
    an execution unit configured to perform a test and compare operation;
    an execution unit configured to perform a data extraction and insertion operation;
    an execution unit configured to perform a branch target address operation; and
    an execution unit configured to perform a branch trigger operation.

11. The programmable micro-controller of claim 6, wherein the programmable micro-controller is a system on a chip.

12. The programmable micro-controller of claim 6, further comprising:
    an embedded buffer memory configured to store packets or data used in forming packets.

13. The programmable micro-controller of claim 6, wherein the instruction words are based on a Very Large Instruction Word (VLIW) architecture or on micro-code architecture.

14. A programmable micro-controller comprising:
    an embedded buffer memory;
    a register set;
    programmable processing circuitry coupled to the embedded buffer memory and the register set, the programmable processing circuitry including a plurality of execution units, each execution unit is configured to execute in parallel an operation within an instruction using the register set, the processing circuitry is configured to parse a packet in the embedded buffer memory for extract data or to encapsulate data in the embedded buffer memory to form a packet using the execution; and
    a programmable template configured to store a plurality of routines, each routine associated with a particular type of protocol.

15. The programmable micro-controller of claim 14, wherein the register set includes a checksum register, buffer pointer register, micro-program register, branch program register, micro-instruction register, flags register, or a constant table.

16. The programmable micro-controller of claim 14, wherein the operation includes a memory load and store operation, checksum operation, test and compare operation, data extraction and insertion operation, branch target address operation, or a branch trigger operation.

17. The programmable micro-controller of claim 16, wherein one of the execution units perform the memory load and store operation, checksum operation, test and compare operation, data extraction and insertion operation, branch target address operation, or the branch trigger operation.

18. A chip, comprising:
    a template comprising a plurality of calls to routines, each routine associated with a particular protocol, each routine including one or more instructions, each instruction including a plurality of operation fields that are processed in parallel to parse a packet or to encapsulate data to form a packet.

19. The template of claim 18, wherein the specific protocol includes existing protocols and new protocols.

20. The template of claim 18, wherein the template is programmable such that a new routine call can be added.

21. The template of claim 18, further comprising:
    identifiers to identify routines for parsing a packet or encapsulating data to form a packet.

22. The template of claim 18, wherein the template is stored on an embedded memory.

23. A programmable micro-controller comprising:
    an embedded memory means for storing one or more instruction words, each instruction word including a plurality of instruction fields; and
    one or more processing means for processing the plurality of instruction fields in parallel for each instruction word, each instruction field related to a specific operation for parsing a packet or encapsulating data to form a packet,
    wherein the embedded memory means further includes a template means for providing a routine associated with each protocol header.

* * * * *

UNITED STATES PATENT AND TRADEMARK OFFICE
CERTIFICATE OF CORRECTION

| | |
|---|---|
| PATENT NO. | : 7,292,586 B2 |
| APPLICATION NO. | : 09/823802 |
| DATED | : November 6, 2007 |
| INVENTOR(S) | : Gautam Dewan et al. |

It is certified that error appears in the above-identified patent and that said Letters Patent is hereby corrected as shown below:

On the Last Page of the Patent, claim 23 was listed incorrectly and claims 24-28 were omitted. Claims 23-28 should read:

23. In a router having a system on a chip, the system on a chip used to parse a packet or to encapsulate data to form a packet, a method for programming the system on a chip comprising:
    downloading a routine for a new type of protocol to the system on a chip;
    storing the downloaded routine in the system on a chip; and
    adding a call to the stored routine in a template, the template tying routines together to parse a packet to extract data or to encapsulate data to form a packet.

24. The method of claim 23, wherein the downloading of the routine includes downloading the routine for a routing protocol.

25. The method of claim 23, wherein the downloading of the routine includes downloading the routine from a network or an external device.

26. The method of claim 25, wherein the downloading of the routine from a network includes downloading the routine from an Internet network.

27. The method of claim 23, wherein the adding of the call to the stored routine includes adding a call to the stored routine related to a new protocol.

UNITED STATES PATENT AND TRADEMARK OFFICE
CERTIFICATE OF CORRECTION

| | |
|---|---|
| PATENT NO. | : 7,292,586 B2 |
| APPLICATION NO. | : 09/823802 |
| DATED | : November 6, 2007 |
| INVENTOR(S) | : Gautam Dewan et al. |

It is certified that error appears in the above-identified patent and that said Letters Patent is hereby corrected as shown below:

28.    A programmable micro-controller comprising:
an embedded memory means for storing one or more instruction words, each instruction word including a plurality of instruction fields; and
one or more processing means for processing the plurality of instruction fields in parallel for each instruction word, each instruction field related to a specific operation for parsing a packet or encapsulating data to form a packet,
wherein the embedded memory means further includes a template means for providing a routine associated with each protocol header.

Signed and Sealed this

Twenty-third Day of September, 2008

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,292,586 B2 |
| APPLICATION NO. | : 09/823802 |
| DATED | : November 6, 2007 |
| INVENTOR(S) | : Gautam Dewan et al. |

It is certified that error appears in the above-identified patent and that said Letters Patent is hereby corrected as shown below:

On the Last Page of the Patent, claim 23 was listed incorrectly and claims 24-28 were omitted. Claims 23-28 should read:

Column 38, lines 54-65 should read
    23.    In a router having a system on a chip, the system on a chip used to parse a packet or to encapsulate data to form a packet, a method for programming the system on a chip comprising:
        downloading a routine for a new type of protocol to the system on a chip;
        storing the downloaded routine in the system on a chip; and
        adding a call to the stored routine in a template, the template tying routines together to parse a packet to extract data or to encapsulate data to form a packet.

Column 38, line 66, insert:
    24.    The method of claim 23, wherein the downloading of the routine includes downloading the routine for a routing protocol.

25.    The method of claim 23, wherein the downloading of the routine includes downloading the routine from a network or an external device.

26.    The method of claim 25, wherein the downloading of the routine from a network includes downloading the routine from an Internet network.

27.    The method of claim 23, wherein the adding of the call to the stored routine includes adding a call to the stored routine related to a new protocol.

UNITED STATES PATENT AND TRADEMARK OFFICE
CERTIFICATE OF CORRECTION

PATENT NO.         : 7,292,586 B2
APPLICATION NO. : 09/823802
DATED                  : November 6, 2007
INVENTOR(S)       : Gautam Dewan et al.

It is certified that error appears in the above-identified patent and that said Letters Patent is hereby corrected as shown below:

28.    A programmable micro-controller comprising:
an embedded memory means for storing one or more instruction words, each instruction word including a plurality of instruction fields; and
    one or more processing means for processing the plurality of instruction fields in parallel for each instruction word, each instruction field related to a specific operation for parsing a packet or encapsulating data to form a packet,
    wherein the embedded memory means further includes a template means for providing a routine associated with each protocol header.

This certificate supersedes the Certificate of Correction issued September 23, 2008.

Signed and Sealed this

Fourteenth Day of October, 2008

JON W. DUDAS
*Director of the United States Patent and Trademark Office*